United States Patent

Longshore

[11] 3,991,634
[45] Nov. 16, 1976

[54] COUNTERSHAFT AUXILIARY TRANSMISSION

[75] Inventor: Donald W. Longshore, New Berlin, Wis.

[73] Assignee: Allis-Chalmers Corporation, Milwaukee, Wis.

[22] Filed: Dec. 19, 1974

[21] Appl. No.: 534,553

[52] U.S. Cl. .................................. 74/745; 74/364; 74/357
[51] Int. Cl.² ........................ F16H 3/02; F16H 3/08
[58] Field of Search ............ 74/740, 745, 364, 357, 74/359, 373, 374, 375

[56] References Cited
UNITED STATES PATENTS

| | | |
|---|---|---|
| 1,195,206 | 8/1916 | Goodspeed ...................... 74/357 X |
| 2,970,482 | 2/1961 | Strehlow et al. ...................... 74/745 |
| 2,975,656 | 3/1961 | Haverlender ......................... 74/745 |
| 2,998,732 | 9/1961 | Nelson ................................. 74/364 |
| 3,149,498 | 9/1964 | Mack ................................... 74/364 |
| 3,354,729 | 11/1967 | Marquart ......................... 74/740 X |
| 3,362,245 | 1/1968 | Francuch et al. ................ 74/745 X |
| 3,673,890 | 7/1972 | Crooks ............................. 74/740 X |
| 3,774,460 | 11/1973 | Browning et al. ................ 74/740 X |
| 3,837,237 | 9/1974 | Rossler et al. ........................ 74/740 |

Primary Examiner—Samuel Scott
Assistant Examiner—Lance W. Chandler
Attorney, Agent, or Firm—Arthur L. Nelson

[57] ABSTRACT

A countershaft transmission having an input shaft selectively driving a clutch carrier connected to the output shaft by selective drive through direct drive and through countershaft driven quill shafts to the clutch carrier.

7 Claims, 4 Drawing Figures

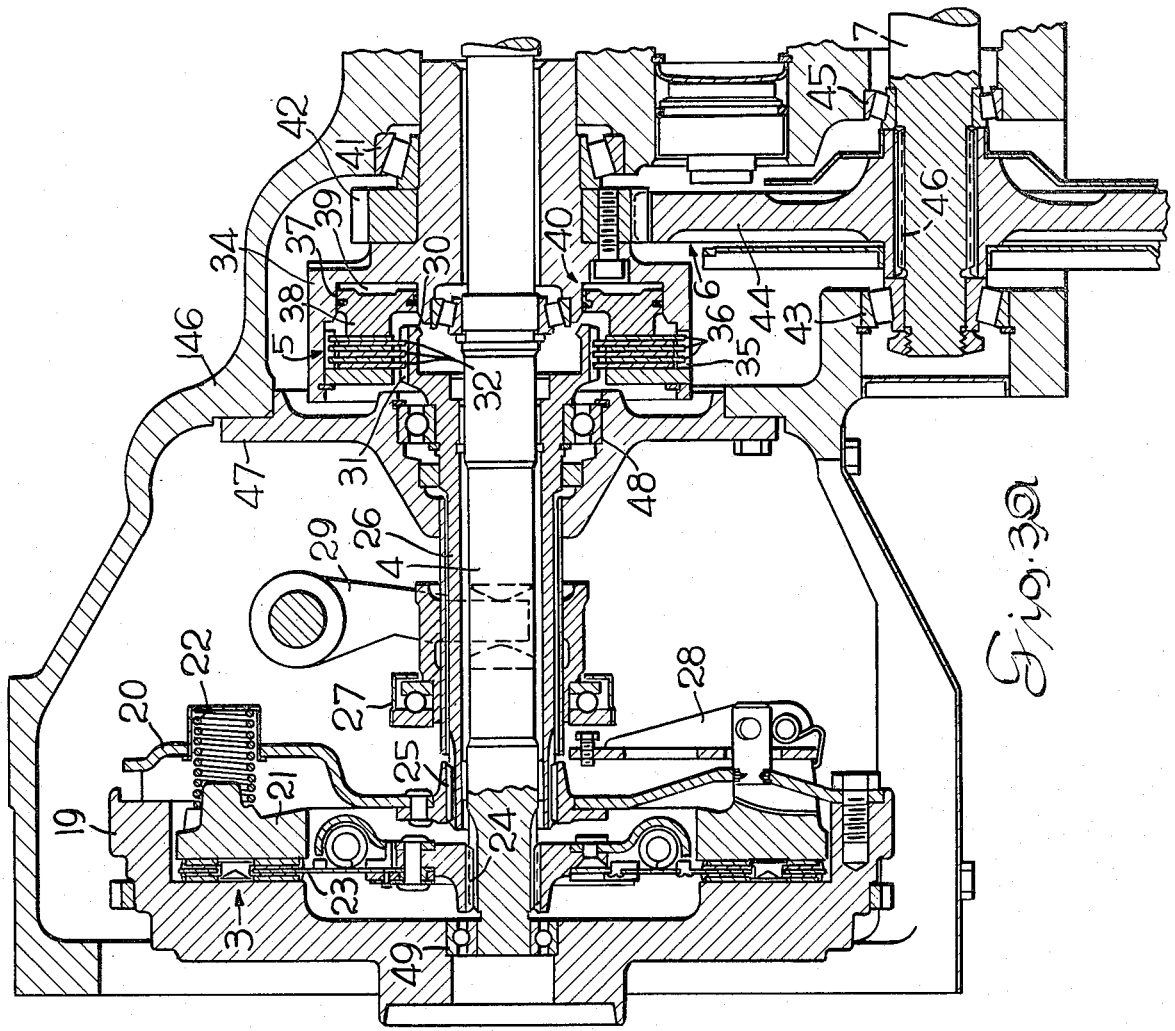
Fig. 3a
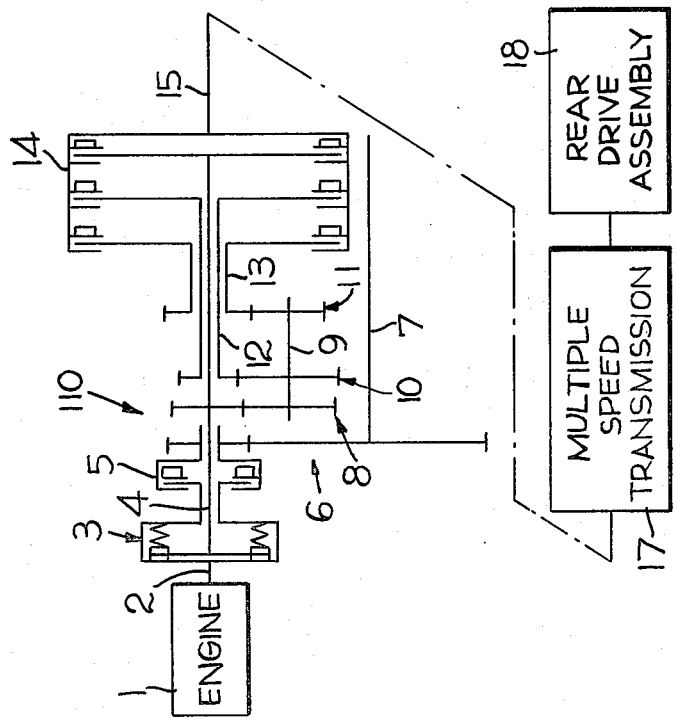
Fig. 1
Fig. 2
| RANGE | CLUTCHES | TORQUE RATIO |
|---|---|---|
| 1 | 68 | 1.265 |
| 2 | 70 | 1.00 |
| 3 | 69 | .814 |

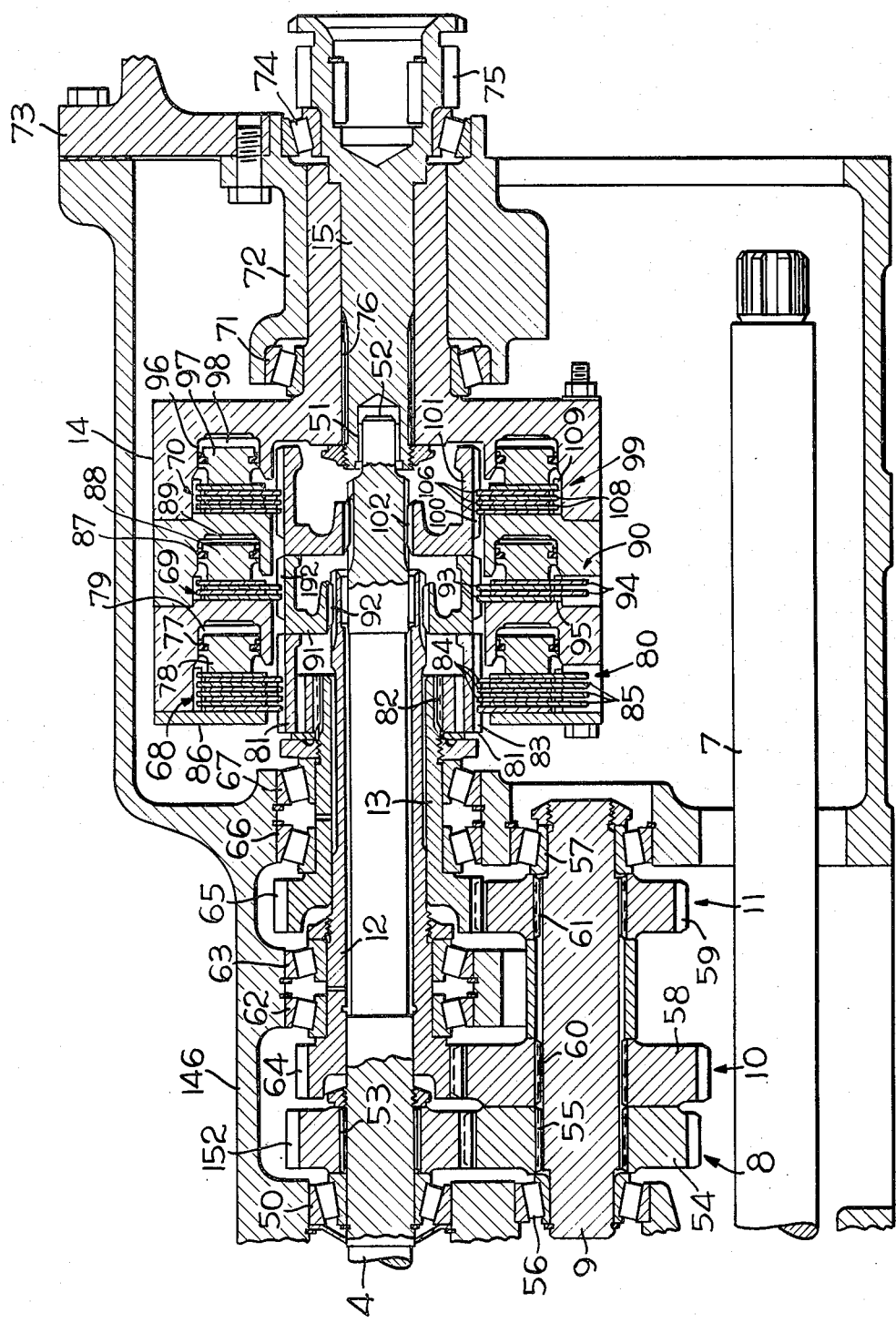

COUNTERSHAFT AUXILIARY TRANSMISSION

This invention relates to a vehicle transmission and more particularly to an auxiliary transmission having an input shaft driving through one of the plurality of clutches on a clutch carrier connected to an output shaft to selectively drive directly to the output shaft or through a countershaft driving through quill shafts to drive the clutch carrier.

Conventional vehicle transmissions such as used in tractors provide a plurality of speed ratios in the forward direction and one or more reverse drives in the transmission. These various speed ratios adapt the tractor for the torque ratios needed in driving the tractor to accommodate the various draft loads necessary in the field. While the conventional tractor having five speeds forward and one in reverse may be adequate in some circumstances, when additional speed ratios are required, it may become increasingly complex to provide these additional speeds in the main transmission. Accordingly, an auxiliary transmission may be utilized in combination with the main transmission. By placing the auxiliary transmission either ahead or behind the main transmission, the speed ratios of the main transmission are multiplied by the number of speed ratios in the auxiliary transmission. For instance, if a five-speed transmission were used, if a three-speed auxiliary transmission is placed immediately in front of the main transmission, the overall number of speed ratios of the gear train would be fifteen. Accordingly, this invention provides such an auxiliary transmission adaptable for use in combination with the main transmission to multiply the speed ratios of the main transmission by three.

It is an object of this invention to provide a three-speed countershaft auxiliary transmission.

It is another object of this invention to provide an auxiliary countershaft transmission driving through a clutch carrier for selectively transmitting power from the input shaft to the output shaft through a countershaft transmission.

It is a further object of this invention to provide a countershaft auxiliary transmission having an input shaft driving directly through the clutch carrier to an output shaft and having countershaft driven quill shafts for selectively driving said clutch carrier to the output shaft.

The objects of this invention are accomplished by providing a vehicle having an engine clutch to drive a three-speed countershaft auxiliary transmission. The countershaft transmission drives through the vehicle main transmission to the rear drive assembly. The countershaft transmission includes an input shaft driving a countershaft gearset which selectively drives through a clutch carrier. The countershaft drives through quill shafts whereby the input shaft and each of the quill shafts carry a clutch hub wherein each hub carries at least one clutch plate in one of the clutches carried on the clutch carrier. The clutches on the clutch carrier can be selectively actuated to provide direct drive from the input shaft through the clutch carrier to the output shaft or selectively drive through one of the countershaft gearsets and one of the quill shafts to drive through the clutch carrier to the output shaft. The auxiliary transmission permits selective drive through the clutches in the clutch carrier to provide a three-speed auxiliary transmission positioned in front of the main transmission to multiply the speed ratios of the main transmission by the three-speed countershaft transmission.

Referring to the drawings, the preferred embodiment of this invention is illustrated.

FIG. 1 is a schematic diagram of the countershaft auxiliary transmission and its arrangement in connection with the vehicle engine and engine clutch as well as the main transmission and the final drive assembly.

FIG. 2 is a table of speed ranges and torque ratios.

FIG. 3A illustrates a cross section view of the front portion of the countershaft auxiliary transmission, the engine clutch and a power take-off drive arrangement in connection with the input drive shaft and engine clutch.

FIG. 3B illustrates a cross section view of the rear portion of the countershaft auxiliary transmission and the clutch carrier and output shaft.

Referring to the drawings, FIG. 1 illustrates a schematic diagram of the power train including the auxiliary countershaft transmission. The engine 1 drives through the drive shaft 2 to the engine clutch 3. The engine clutch 3 connects the drive shaft 2 to the input shaft 4 for driving through the auxiliary transmission. A power take-off clutch 5 is also connected to the input shaft 2. The power take-off clutch drives through a countershaft gearset 6 and a power take-off shaft 7 to provide power for auxiliary equipment on the tractor.

The input shaft 4 drives through a countershaft gearset 8 to the countershaft 9. The countershaft 9 drives through the gearsets 10 and 11 through the quill shafts 12 and 13 respectively. The input shaft 4 and the quill shafts 12 and 13 each carry a clutch hub. Each clutch hub carries one or more clutch discs which are singularly connected in one of its clutches carried on the clutch carrier 14. The clutch carrier 14 drives the output shaft 15. The output shaft 15 drives through the main transmission 17 and the rear drive assembly 18 for driving the vehicle.

FIG. 2 illustrates the three-speed ranges of the auxiliary countershaft transmission in which a torque ratio selectively decreases as the speed range increases.

The drive shaft 2 (not shown in FIG. 3A) drives the flywheel 19. The flywheel 19 carries a clutch cover 20 and the pressure plate 21. A plurality of springs of which one spring 22 is shown biases pressure plate 21 to cause engagement of the friction plate 23 between the flywheel and pressure plate 21. The clutch plate 23 is connected by a spline 24 to the input shaft 4. The clutch cover plate 20 is connected by a spline connection 25 to the clutch sleeve 26. A thrust bearing 27 and suitable linkage 28 selectively engages and disengages the engine clutch 3 through the operation of the clutch lever 29 which is manually controlled.

Clutch sleeve 26 forms the power take-off clutch hub 30 which has a spline 31 on its outer periphery which carries a plurality of clutch discs 32 of the power take-off clutch 5. The drum 34 forms a spline 35 which carries a plurality of clutch discs 36 which frictionally engage the clutch disc 32 of clutch 5. The drum 34 forms the hydraulic cylinder 37 which receives the piston 38 to form the hydraulic actuating chamber 39 of the hydraulic actuator 40. The drum 34 is rotatably mounted in the bearing assembly 41 and carries a gear 42 of the gearset 6. The driven gear 44 of gearset 6 is connected to the power take-off shaft 7 by the spline connection 46. The power take-off shaft 7 is rotatably mounted into bearing assemblies 43 and 45.

The clutch housing 146 carries the bearing support 47 which embraces the bearing assembly 48 which rotatably supports the clutch sleeve 26. The bearing assembly 49 embraces the end of the input shaft 4 and is received within the flywheel 19. The input shaft 4 is also rotatably supported in the bearing assembly 50 carried in the clutch housing 146. The input shaft 4 extends axially and is received within the output shaft 15. The rear bearing assembly 51 embraces the end 52 of the input shaft 4 and is embraced by the output shaft 15.

The input shaft 4 carries the drive gear 152 and is connected by the spline 53 with the shaft 4. The drive gear 152 drives the driven gear 54 of the gearset 8. The driven gear 54 is connected by the spline 55 to the countershaft 9. The countershaft 9 is rotatably mounted in the bearing assemblies 56 and 57. The countershaft carries gears 58 and 59 and is spline connected through the spline connections 60 and 61 respectively.

The quill shaft 12 is rotatably mounted in the bearing assemblies 62 and 63 of the transmission housing 146. The quill shaft 12 forms a gear 64 which drives the quill shaft 12. The quill shaft 12 carries the clutch hub 91.

The quill shaft 13 forms the gear 65. The gear 59 drives the gear 65. The quill shaft 13 is rotatably mounted in the bearing assemblies 66 and 67 which are carried on the transmission housing 146.

The clutch carrier 14 carries the clutches 68, 69 and 70. The clutch carrier is rotatably mounted on the bearing assembly 71 and received within the sleeve 72 which is fastened to the front wall 73 of the main transmission housing. The output shaft 15 is embraced by the bearing assembly 74 which is supported in the sleeve 72. The output shaft 15 forms a drive gear 75 adapted for driving the main transmission 17.

The output shaft 15 is connected to the clutch carrier 14 by the spline connection 76. The clutch carrier 14 forms a plurality of hydraulic actuators operating the clutches 68, 69 and 70. The clutch 68 includes a hydraulic cylinder 77 receiving the piston 78 to form a pressurizing chamber 79. The piston 78 compresses the disc stack 80. The clutch hub 81 is connected by the spline 82 to the quill shaft 13. The clutch hub 81 forms the spline 83 which carry the discs 84. The discs 85 are connected to the carrier 14 and compressed against the reaction plate 86 when the clutch 68 is actuated.

The clutch 69 includes the hydraulic cylinder 87 which receives the hydraulic piston 88 forming the pressurizing chamber 89. The piston 88 compresses the disc stack 90 to actuate the clutch 69. The clutch hub 91 is connected by a spline connection 92 to the quill shaft 12. The clutch hub 91 forms the spline 192 for connection to the clutch discs 93. The clutch discs 94 are connected to the spline 95 of the carrier 14.

The cylinder 96 receives the piston 97 to form the pressurizing chamber 98. The disc stack 99 is compressed to actuate the clutch 70. The spline 100 is formed by the clutch hub 101. The clutch hub 101 is connected by the spline 102 to the input shaft 4. The disc stack 99 includes the discs 106 connected by the spline 100 to the clutch hub 101. The clutch discs 108 are connected by the spline 109 to the clutch carrier 14.

The operation of this device will be described in the following paragraphs.

The engine 1 drives through the engine clutch 3 and the input shaft 4 to the auxiliary countershaft transmission 110. The auxiliary countershaft transmission drives through the multiple speed transmission 17 and the rear drive assembly 18 to drive the vehicle.

The engine clutch 3 can be selectively engaged or disengaged to connect the power to the input shaft 4. The input shaft 4 can be driven through the clutch carrier 14 to the output shaft 15 through the clutch 70. The input shaft 4 drives the clutch hub 101 through the clutch 70 when the clutch is engaged to the clutch carrier 14 and through the output shaft 15.

Power transmission can also be transmitted through the countershaft gearset 8 through the countershaft 9 through gears 58 and 64 to the quill shaft 12 and through the clutch hub 91 and clutch 69 or the clutch carrier 14 to the output shaft 15.

Power transmission can be transmitted from the input shaft 4 through the gearset 8 to the countershaft 9 and back through gears 59 and 65 to the quill shaft 13, clutch hub 81 and clutch 68 to the clutch carrier 14. The clutch carrier 14 is connected to the output shaft 15 and accordingly power is transmitted from the output shaft to the main transmission 17. It can be seen that the auxiliary transmission provides one of three speeds driving directly from the input to the output shaft or driving through the countershaft gearsets and the countershaft 9 by selectively engaging the desired clutch 68 or 69.

The power from the engine 1 is also transmitted through the drive shaft to the clutch sleeve 26 through the power take-off clutch 5 and through the countershaft gearset 6 to drive the power take-off shaft 7. The drive through the power take-off shaft does not affect the countershaft transmission in any way but provides the means for selectively providing power through the transmission to operate auxiliary equipment.

The embodiments of the invention in which an exclusive property or privilege is claimed are defined as follows:

1. An auxiliary countershaft transmission comprising, a drive shaft, an input shaft and a plurality of quill shafts mounted for forward rotation about a common axis, an engine driven clutch for selectively engaging and disengaging power transmission between said drive shaft and said input shaft, a power take-off countershaft mounted for rotation about an axis parallel with said common axis, a power take-off gearset driving said power take-off countershaft, a hydraulic power take-off clutch between said drive shaft and power take-off gearset for selectively transmitting power to said power take-off countershaft, a clutch carrier and an output shaft rotatably mounted for rotation about said common axis, a countershaft mounted for rotation about an axis parallel with said common axis, a countershaft gearset continuously driving said countershaft including a drive gear fixed to said input shaft for synchronous rotation with said input shaft, a driven gear fixed to said countershaft for synchronous rotation with said countershaft, a plurality of quill shaft gearsets including two drive gears integrally connected to said countershaft and in driving engagement with two driven gears, one of said driven gears integrally connected to the first of said quill shafts, the other of said driven gears integrally connected to another of said quill shafts, a clutch hub on each of said input shaft and said quill shafts, a plurality of hydraulic clutches on said clutch carrier, a friction member on each of said clutch hubs, each of said clutches on said clutch carrier including at least one friction member on a mating clutch hub for selectively transmitting power from said input shaft to said output shaft selectively through said input shaft and said countershaft and one of said quill shafts to thereby selectively provide a plurality of forward speed ratios through said auxiliary countershaft transmission.

2. An auxiliary countershaft transmission as set forth in claim 1 wherein said plurality of quill shafts include a first quill shaft rotating within a second quill shaft.

3. An auxiliary countershaft transmission as set forth in claim 1 including a multiple speed main transmission and rear drive assembly connected for receiving power transmission from said auxiliary countershaft transmission whereby said countershaft transmission multiplies the speed ratios of said multiple speed main transmission.

4. An auxiliary countershaft transmission as set forth in claim 1 wherein said hydraulic clutches in said clutch carrier include, means for hydraulically actuating said clutches for selectively transmitting power through one of said plurality of clutches on said clutch carrier to provide a plurality of gear ratios through said auxiliary countershaft transmission.

5. An auxiliary countershaft transmission as set forth in claim 1 said engine clutch includes a mechanical clutch adapted for driving said input shaft.

6. An auxiliary countershaft transmission as set forth in claim 1 wherein each quill shaft gearset includes an integral driven gear on each of said quill shafts.

7. An auxiliary countershaft transmission as set forth in claim 1 wherein said countershaft carries two drive gears, a first quill shaft gearset including the first of said drive gears, a second quill shaft gearset including a second of said drive gears on said countershaft, a clutch hub on each one of said two quill shafts, said clutch disc connected to each clutch hub included in one of said clutches in said clutch carrier to thereby provide two selective power paths through said countershaft and said quill shaft gearsets.

* * * * *